US009951976B2

(12) United States Patent
Moghaddam et al.

(10) Patent No.: US 9,951,976 B2
(45) Date of Patent: Apr. 24, 2018

(54) ARCHITECTURE FOR ABSORPTION BASED HEATERS

(71) Applicant: University of Florida Research Foundation, Inc., Gainesville, FL (US)

(72) Inventors: Saeed Moghaddam, Gainesville, FL (US); Devesh Chugh, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 15/316,246

(22) PCT Filed: Jun. 2, 2015

(86) PCT No.: PCT/US2015/033745
§ 371 (c)(1),
(2) Date: Dec. 5, 2016

(87) PCT Pub. No.: WO2015/187667
PCT Pub. Date: Dec. 10, 2015

(65) Prior Publication Data
US 2017/0191708 A1     Jul. 6, 2017

Related U.S. Application Data

(60) Provisional application No. 62/008,084, filed on Jun. 5, 2014.

(51) Int. Cl.
*F25B 15/16*     (2006.01)
*F25B 15/00*     (2006.01)

(52) U.S. Cl.
CPC ............ *F25B 15/16* (2013.01); *F25B 15/00* (2013.01)

(58) Field of Classification Search
CPC ................................. F25B 15/16; F25B 15/00
See application file for complete search history.

(56) References Cited

U.S. PATENT DOCUMENTS

| | | | |
|---|---|---|---|
| 6,487,875 B1* | 12/2002 | Sarkisian | B01D 3/007 62/476 |
| 2010/0281899 A1 | 11/2010 | Garrabrant | |
| 2013/0133346 A1* | 5/2013 | Garimella, Sr. | F25B 15/02 62/101 |

FOREIGN PATENT DOCUMENTS

WO    WO 2013-063210     5/2013

OTHER PUBLICATIONS

Isfahani et al.: Absorption characteristic of lithium bromide solution constrained by superhydrophobic nanofibrous structures, Aug. 2013, International Journal of Heat and mass Transfer; https://www.researchgate.net/publication/256718782.*

(Continued)

*Primary Examiner* — Emmanuel Duke
(74) *Attorney, Agent, or Firm* — Saliwanchik, Lloyd & Eisenschenk

(57) ABSTRACT

An absorption based heater is constructed on a fluid barrier heat exchanging plate such that it requires little space in a structure. The absorption based heater has a desorber, heat exchanger, and absorber sequentially placed on the fluid barrier heat exchanging plate. The vapor exchange faces of the desorber and the absorber are covered by a vapor permeable membrane that is permeable to a refrigerant vapor but impermeable to an absorbent. A process fluid flows on the side of the fluid barrier heat exchanging plate opposite the vapor exchange face through the absorber and subsequently through the heat exchanger. The absorption based heater can include a second plate with a condenser situated parallel to the fluid barrier heat exchanging plate (Continued)

and opposing the desorber for condensation of the refrigerant for additional heating of the process fluid.

8 Claims, 3 Drawing Sheets

(56) References Cited

OTHER PUBLICATIONS

Isfahani, R.N. et al., "Physics of lithium bromide (LiBr) solution dewatering through vapor venting membranes," *International Journal of Multiphase Flow*, 2014, pp. 27-38, vol. 58.
Isfahani, R.N. et al., "Absorption characteristics of lithium bromide (LiBr) solution constrained by superhydrophobic nanofibrous structures," *International Journal of Heat and Mass Transfer*, 2013, pp. 82-90, vol. 63.
Gluesenkamp, K. "Development of High Performance Residental Gas Water Heater," BTO Program Peer Review, Apr. 3, 2013, [online, webpage, retrieved Feb. 13, 2016] from: https://energy.gov/sites/prod/files/2013/12/f5/emrgtech10_gluesenkamp_040313.pdf., pp. 1-15.

* cited by examiner

ARCHITECTURE FOR ABSORPTION BASED HEATERS

CROSS-REFERENCE TO RELATED APPLICATIONS

This application is the U.S. national stage application of International patent application No. PCT/US2015/033745, filed Jun. 2, 2015,which claims the benefit of U.S. Provisional Application Ser. No. 62/008,084, filed Jun. 5, 2014, the disclosures of which are hereby incorporated by reference in their entireties, including all figures, tables and drawings.

This invention was made with government support under DE-AC08-00OR22725 awarded by the Department of Energy. The government has certain rights in the invention.

BACKGROUND OF INVENTION

Absorption heaters of absorption refrigeration systems, ARSs can use low-grade thermal energy, such as waste heat and solar-thermal energy, for dehumidifying and water heating; which can allow development of high performance, inexpensive, and robust systems.

In attempts to build compact and inexpensive systems, alternative heat exchanger configurations and system architectures have been examined. Depending on the choice of working fluid pairs, absorption systems are classified as ammonia-water or lithium bromide-water systems. LiBr-water systems use water as the refrigerant and LiBr solution as the absorbent. The size of heat exchangers required for absorption and desorption of water must account for the limited water mass transfer coefficient of LiBr solution. By enhancing the absorption and desorption transport processes, compact heat exchanger architectures can be developed for economical small-scale heating and cooling systems.

Absorbers and desorbers commonly employed in LiBr-water ARSs use a falling film over horizontal or vertical tubes or use a pool boiling configuration where water is boiled from a pool of LiBr solution. Falling-film desorbers are more suitable with low temperature heat sources. In a falling film desorber, LiBr solution is sprayed over a tube bundle to generate thin solution films over the tubes to facilitate a higher rate of water desorption while the heating medium flows within the tubes. At low surface temperatures, water directly diffuses out of the solution film until the solution temperature is insufficient to sustain a sufficient water vapor pressure above the solution.

Recently, thin film systems have been investigated to enhance the efficiency of these absorbers and desorbers. Although the earlier work indicated that the absorption rates were only about half of that achievable with the conventional absorbers, the development of ultra-thin film absorbers, Moghaddam et al., WO2013/063210; Isfahani et al., *International Journal of Heat and Mass Transfer*, 2013, 63, 82-90 and Isfahani et al., *International Journal of Multiphase Flow*, 2014, 58, 27-38, identifies an absorber structure using a nanofiber membrane where the absorption rate is improved to beyond that possible from conventional absorbers. In like manner, an ultra-thin film absorber can function as an ultra-thin film desorber when the cooling source employed in the absorber is replaced with a heating source to drive desorption. Hence, a system employing ultra-thin film absorbers and desorbers for systems that can provide improved water heating and dehumidification with the achievement of sufficient surface area and with minimal volume loss in a building is desirable.

BRIEF SUMMARY

An embodiment of the invention is directed to an absorption based heater, having a desorber, heat exchanger, and absorber sequentially residing on different portions of a fluid barrier heat exchanging plate. Vapor exchange faces of the desorber and the absorber are covered by vapor permeable membranes on a vapor exchange face of the fluid barrier heat exchanging plate and a vapor barrier covers the heat exchanger on the vapor exchange face. The vapor permeable membrane is permeable to a refrigerant in the vapor state but impermeable to an absorbent solution that flows on the vapor exchange faces of the absorption based heater. A process fluid flows on an opposing side of the fluid barrier heat exchanging plate through the absorber and subsequently through the heat exchanger of the absorption based heater. The absorbent solution can be an aqueous LiBr solution with the refrigerant being water. The process fluid can be water. Alternatively, the absorbent solution can be an ionic liquid solution, and the refrigerant can be a solvent for the ionic liquid. The fluid barrier heat exchanging plate can have a plurality of three-dimensionally structured microchannels. The absorption based heater can also include a condenser on a second plate situated parallel to the fluid barrier heat exchanging plate with the vapor entry face of the condenser opposing the vapor exchange face of the desorber with the process fluid being directed from the heat exchanger through a conduit to the condenser.

Another embodiment of the invention is directed to a method of heating a process fluid using the absorption based heater described above, where a process fluid passes into and through the absorber and subsequently into and through the heat exchanger and the process fluid from the heat exchanger and is discharged at a temperature in excess of the temperature of the process fluid entering the absorber. The process fluid discharged from the heat exchanger can be directed into and through a condenser such that the process fluid discharged from the condenser has a temperature greater than the temperature of the process water discharged from the heat exchanger.

DETAILED DISCLOSURE

Figure 1:
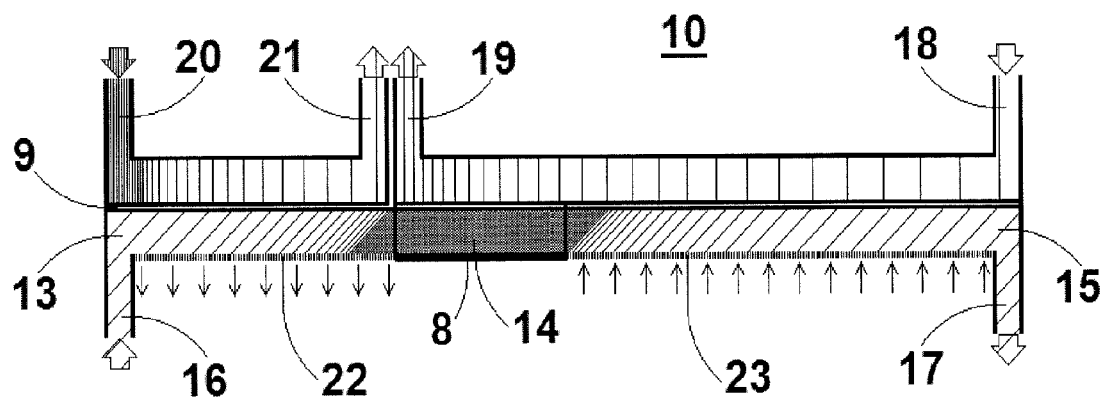
FIG. 1 shows a schematic cross section of an absorption based heater, according to an embodiment of the invention.

Embodiments of the invention are directed to absorption based heaters comprising an absorber and desorber separated by a heat exchanger and the absorption based heater's use to captures low grade heat for useful heating of a process fluid. As described herein, the process fluid is conveniently water, although other process fluids can be employed. The absorption based heater forms a flow loop where a refrigerant goes through a cycle of absorption and desorption with a suitable absorbent contained within the loop. As described herein, the refrigerant can be water where the absorbent solution is an aqueous solution, although other refrigerants can be used where the refrigerant is the solvent of the absorbent solution. The refrigerant condenses and evaporates in portions of a complementary loop. A heat exchanger downstream of the desorber transfers heat between the absorbent solution that exits the desorber and the process fluid that exits the absorber with a heat gain of the process fluid that nearly equals the heat loss of the absorbent solution. The process fluid entering the heat exchanger has already absorbed heat from the absorber. The process fluid that has absorbed heat from the absorber and heat exchanger of the absorption based heater can subsequently flow through a condenser of the refrigerant in a complementary loop where the process water absorbs additional heat.

Absorbent solutions can be chosen from any working fluid pair, such as used in absorption systems that are classified as ammonia-water or lithium bromide-water systems. For example, LiBr-water systems use water as the refrigerant solvent and LiBr as a non-volatile solute of the absorbent. The system is not so limited, as any absorbent solution of volatile solvent and non-volatile solute or volatile solute and non-soluble solvent can be employed. For example, the absorbent solution can be an ionic liquid with water or organic liquid, for example, but not limited to, an alcohol, such as, but not limited to, methanol, ethanol, or i-propanol, a hydrocarbon, such as, but not limited to, any $C_1$ to $C_7$ hydrocarbon, an ether, such as, but not limited to dimethyl ether, diethyl ether, tetrahydrofurane, or dioxane, an amine, such as, but not limited to, ammonia, methyl amine, ethyl amine, triemethyl amine, triethyl amine, or pyridine, or any other organic liquid of reasonable volatility. The non-volatile ionic liquid can be the solvent or the solute, depending upon how the fluid system is constructed, where the non-volatile ionic liquid can be used as the solvent with the organic liquid acting as the solute or the ionic liquid can act as the solvent and the organic liquid as the solute. When the organic liquid acts as the solvent, the absorbent solution can be pure solvent before absorption and after desorption of the volatile solute. Ionic liquids that can be used include, but are not limited to, 1-ethyl-3-methylimidazolium dicyanamide, 1-butyl-3,5-dimethylpyridinium bromide, ethylammonium nitrate, 1-butyl-3-methylimidazolium tetrafluoroborate, 1-butyl-3-methylimidazolium chloride, N-butyl-N-methylpyrrolidinium bis(trifluoromethylsulfonyl)imide, N-methyl-N-propyl-piperidinium bis(trifluoromethylsulfonyl)imide, or any other ionic liquid that remains liquid in solution or as the neat fluid depending upon the system employing the ionic liquid as the solvent or solute. In addition to ionic liquids, non-volatile liquids can be matched to volatile liquids in the manner where the ionic liquid is employed, for example, but not limited to, a polyethylene glycol and water, an alcohol, an ether, or other small molecular organic liquid can be employed as the absorbent solution.

According to an embodiment of the invention, the absorption based heater employs membrane based thin film absorption technology to allow the fabrication of a compact unit. The absorption based heater employs membranes over three-dimensionally structured microchannels on the heat-exchanging surface between the desorber and the heating fluid and the absorber and the process fluid. The structure and advantage of the membrane based thin film absorber and desorber are taught in U.S. Provisional Application Ser. No. 61/922,460 filed Dec. 31, 2013, which is incorporated in its entirety herein. A vapor-permeable, liquid impermeable membrane covers the vapor-exchanging surfaces of the absorber and desorber of the absorption based heater. Three-dimensionally structured microchannels reside on the heat-exchanging surface to promote vortices for mixing of the temperatures and absorbent concentrations between the heat-exchanging and vapor-exchanging surfaces of the absorber and desorber portions of the absorption based heater The coefficient of performance (COP) of present absorption based water heaters is around 1.5 and these heaters are only available for large scale applications because reduction in their size results in a decrease of the COP. The COP of the absorption based heaters, according to embodiments of the invention, is about 1.63 even when fabricated in compact size because of the thin film absorption technology employed and the manner in which the process fluid is plumbed. These systems are suitable for residence application, and can permit a lowering of manufacturing costs.

In an embodiment of the invention, the absorption based heater is fabricated in a plate and frame heat and mass exchanger configuration. For example, a single thin metal sheet can be partitioned into three sections, absorber, desorber and heat exchanger employing a fluid barrier heat exchanging plate 9, as shown in FIG. 1, according to an embodiment of the invention. The desorber 13, heat exchanger 14, and absorber 15 can be separated from a heating fluid and process fluid on a distal face 12 to the vapor exchange face 11 of the absorber 15 and desorber 13 by a common fluid barrier heat exchanging plate 9, for example, a thin metal sheet. On the vapor exchange face 11 of the absorption based heater 10, absorbent solution, for example, aqueous LiBr, flows from desorber 13 to heat exchanger 14 and to absorber 15 via channels etched or otherwise constructed on the fluid barrier heat exchanging plate 9, where the heat exchanger 14 is covered by a vapor barrier sheet 8 rather than a vapor permeable membrane 22, and 23. Additionally the heat exchanger 14 can have a thermally insulating vapor barrier sheet 8 opposite the heat exchanging plate 9 to promote heat exchange that occurs almost exclusively to the process fluid. Cool process water enters inlet 18, absorbs heat from the absorbent solution flowing through the absorber 15, where refrigerant is absorbed with the release of heat. Subsequently, the flowing process water absorbs additional heat in the heat exchanger 14 from the flowing absorbent solution exiting the heated desorber 13 before the hot process water exits process water outlet 19. As illustrated, heating fluid enters a hot inlet 20, flows on the back side 12 of the desorber 13, and provides the required heat to devolatilize the absorbent solution with vapor loss through the vapor permeable membrane 22 on the vapor exchange face 11. As would be understood by those of ordinary skill in the art, the fluid flow, as illustrated in FIG. 1 with a "parallel current" flow, can be the alternative with a "counter current" flow, where the port 21 acts as the hot inlet rather than the outlet, and the port 20 acts as the outlet rather than the hot inlet.

The vapor exchange face of the absorber and desorber are constructed to be separated from the fluid barrier heat exchanging plate by a sealed edge; to have a width that is equivalent to the structured microchannels on the fluid barrier heat exchanging plate; and to have a sealing material on the edges and upon the edges of the microchannels distal to the heat exchanging surface for attachment of the membranes. The central fluid barrier heat exchanging plate 9 can be molded or machined to have complementary microchannel features on the surface proximal the vapor exchange face or on both surfaces of the fluid barrier heat exchanging plate to promote turbulent flow in the heating and process fluid conduits of the absorption based heater.

Figure 2:
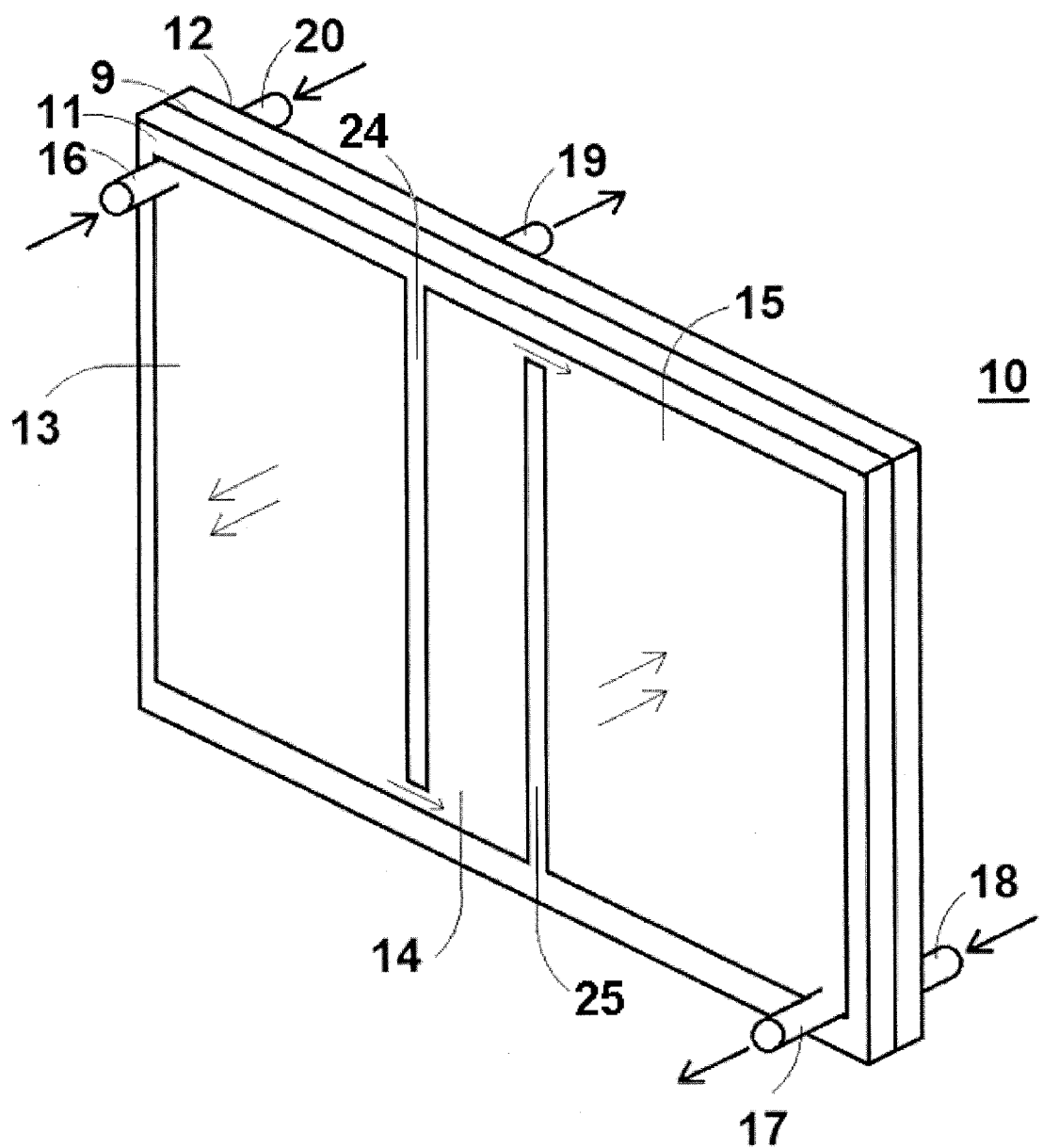
FIG. 2 shows an absorption based heater having a horizontal configuration, according to an embodiment of the invention.

As illustrated in FIG. 1, the cool dilute absorbent solution flows from an inlet 16 at the top of the desorber 13 to a low point of the desorber 13, where diagonal hatching qualitatively indicates the relative absorbent concentration by the density of lines. As shown in FIG. 2 for a side-to-side horizontal configuration, a partitioning wall 24 forms a low desorber exit that is the inlet to the heat exchanger 14 and a second partitioning wall 25 forms a high heat exchanger outlet, which is the absorber inlet 14. As the absorbent solution flows through the desorber 13, the solution is heated from the heating fluid, where temperature change in the heating fluid is indicted by the density of vertical hatching in FIG. 1. Upon heating, the refrigerant is expelled from the absorbent solution across a membrane 22 that permits refrigerant vapor to exit the desorber 13, which results in the concentration of the absorbent solution. The hot concentrated absorbent fluid flows upward through the heat exchanger 14 to the absorber 15 through a second high inlet. The absorbent solution is diluted by refrigerant vapor that passes through the membrane 23 as the absorbent solution progresses through the absorber 15, where the density of diagonal hatching in FIG. 1 across the absorber 15 indicates the qualitative change in absorbent concentration. Dilute cool absorbent solution exits the absorber at a low exit 17. The exit 17 is connected through a means to promote the absorbent solution flow, for example, a pump, where the absorbent fluid is returned to the desorber inlet 16. As shown in FIG. 2, the cool process fluid that enters inlet 18 proceeds through a conduit separated from the absorber 15 by the fluid barrier heat exchanging sheet 9 with an increase in temperature, as indicated by the density of vertical hatching, and continues to heat as it passes through the fluid conduit on the face of the absorption based heater opposite the heat exchanger 14.

The invention is not limited to the design illustrated in FIG. 2, as the orientation of the components of the absorption based heater, as illustrated in FIG. 1, can be situated from top-to-bottom, or vertically, rather than side-to-side. In a vertical stack, the absorbent solution drains from the desorber 13 into the heat exchanger 14 and subsequently into the absorber 15. In a vertical configuration, the partitioning walls 24 and 25 are not required as gravity flow can ensure the effective transport of all absorbent solution from the desorber 13 through a heat exchanger 14 and subsequently through the absorber 15 of the absorption based heater 10. The vapor barrier sheet 8 of the heat exchanger 14 partitions the desorber 13 section from the absorber 15 section.

Figure 3:
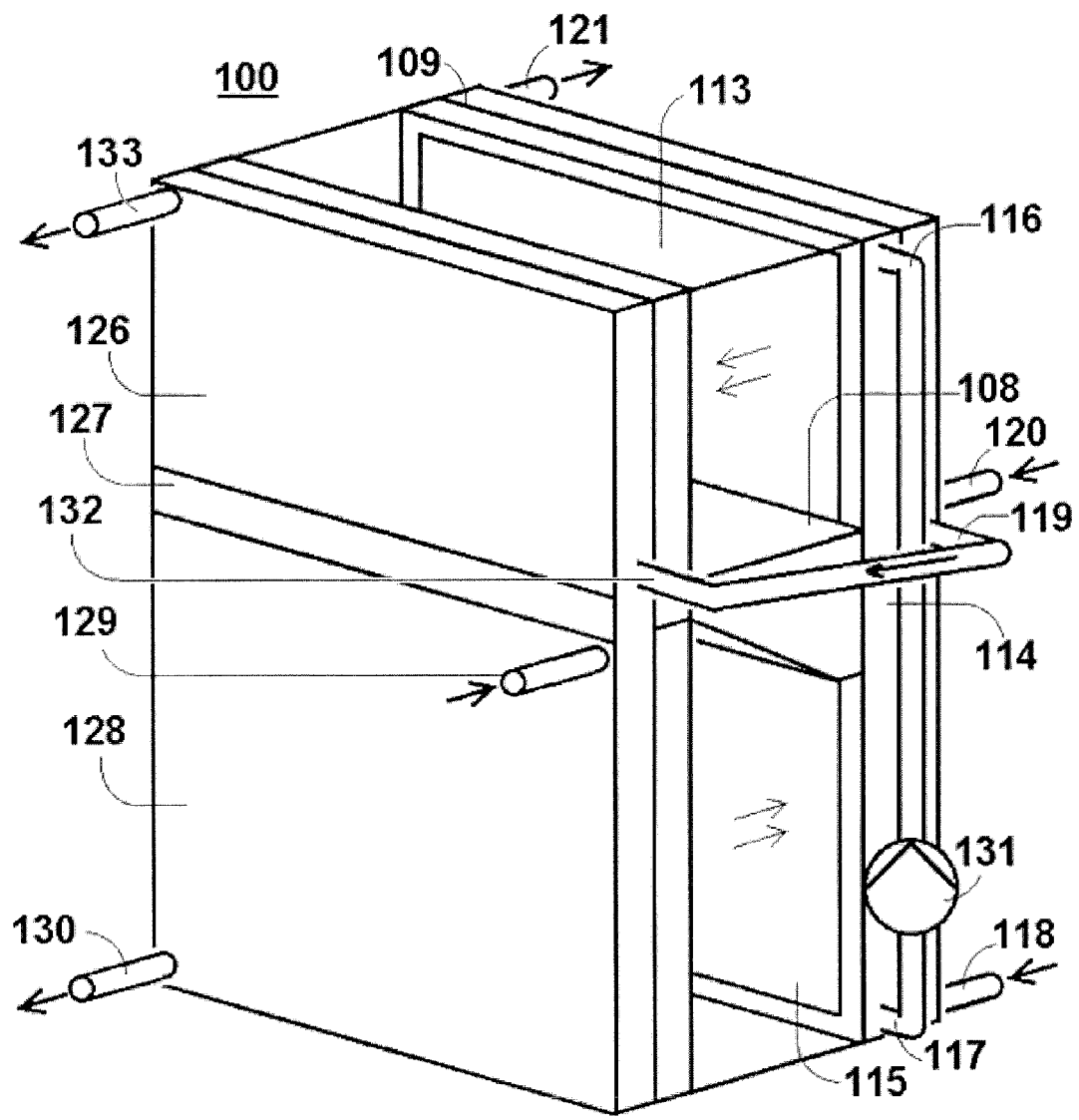
FIG. 3 shows an absorption based heater having a vertical configuration and includes a complementary loop with a condenser and an evaporator, according to an embodiment of the invention.

In an embodiment of the invention, an absorption based heater includes a condenser 126 in a complementary refrigerant loop fabricated on a second plate, as shown in FIG. 3, for a vertical absorption based heater 110. In this configuration, the process fluid exiting the heat exchanger 113 from process fluid outlet 119 is transmitted through a conduit to a condenser coolant inlet 132 where the process fluid functions as the coolant in condenser 126 to absorb heat generated by the condensation of the refrigerant on a face opposing the desorber 113. The vapor entry face of the condenser is positioned for exposure to the vapor exit face of the desorber 113 with an appropriate vapor gap situated between the vapor exit face of the desorber 113 and the vapor entry face of the condenser 126. The vapor gap can be narrow or wide to accommodate other features of the absorption based heater system. The condensed refrigerant drains to a distributer 127 where the condensed refrigerant is evaporated with the aid of a warm evaporator fluid that is introduced through an inlet 129 and transmitted through an outlet 130 as a cool evaporator fluid. The evaporator fluid can be air that is in communication with an air space of a building to be used as a source of cool air. In this manner, the process fluid exits the condenser 126 through a condenser outlet 133 at a temperature in excess of its temperature at the condenser inlet 132. In this manner the process fluid has been heated by three devices: the absorber 115; the heat exchanger 114; and the condenser 126. The COP can be about 1.63 in such a configuration. The absorbent solution is circulated from the absorber 115 to the desorber 113 by a pump 131.

All patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An absorption based heater, comprising a desorber, heat exchanger, and absorber sequentially residing on different portions of a fluid barrier heat exchanging plate, wherein vapor exchange faces of the desorber and the absorber are covered by vapor permeable membranes on a vapor exchange face of the fluid barrier heat exchanging plate and a vapor barrier covers the heat exchanger on the vapor exchange face, wherein the vapor permeable membrane is permeable to a refrigerant in the vapor state but impermeable to an absorbent solution that flows on the vapor exchange faces of the absorption based heater, wherein a process fluid flows on an opposing side of the fluid barrier heat exchanging plate through the absorber and subsequently through the heat exchanger of the absorption based heater.

2. The absorption based heater according to claim 1, wherein the absorbent solution is an aqueous LiBr solution, the refrigerant is water, and the process fluid comprises water.

3. The absorption based heater according to claim 1, wherein the absorbent solution comprises an ionic liquid.

4. The absorption based heater according to claim 1, wherein the fluid barrier heat exchanging plate comprises a plurality of three-dimensionally structured microchannels.

5. A method of heating a process fluid, comprising:
providing an absorption based heater according to claim 1;
passing a process fluid into and through the absorber and subsequently into and through the heat exchanger; and
discharging the process fluid from the heat exchanger at a temperature in excess of the temperature of the process fluid entering the absorber.

6. The absorption based heater according to claim 1, further comprising a condenser on a second plate situated parallel to the fluid barrier heat exchanging plate with the vapor entry face of the condenser opposing the vapor exchange face of the desorber, wherein the process fluid is directed from the heat exchanger through a conduit to the condenser.

7. The method of claim 5, further including the condenser according to claim 4, wherein the process fluid discharged from the heat exchanger is directed into and through the condenser and wherein the process fluid discharged from the condenser has a temperature greater than the temperature of the process water discharged from the heat exchanger.

8. The method of claim 5, wherein the process flied comprises water.

* * * * *